United States Patent [19]

Sheldon et al.

[11] Patent Number: 5,556,242

[45] Date of Patent: Sep. 17, 1996

[54] SPACE FRAME FOR A MACHINE TOOL

[75] Inventors: Paul C. Sheldon, Mequon; Edward E. Kirkham, Brookfield, both of Wis.

[73] Assignee: Giddings & Lewis, Inc., Fond du Lac, Wis.

[21] Appl. No.: 261,682

[22] Filed: Jun. 17, 1994

[51] Int. Cl.$^6$ ........................................... B23C 1/06
[52] U.S. Cl. .................... 409/132; 408/234; 409/201; 409/211; 409/235; 901/23
[58] Field of Search ................... 408/234, 236; 409/131, 132, 183, 201, 211, 235; 901/23, 24

[56] References Cited

U.S. PATENT DOCUMENTS

| | | |
|---|---|---|
| 4,872,291 | 10/1989 | Lindsey . |
| 4,988,244 | 1/1991 | Sheldon et al. . |
| 5,028,180 | 7/1991 | Sheldon et al. . |
| 5,152,645 | 10/1992 | Corsi . |
| 5,259,710 | 11/1993 | Charles . |
| 5,354,158 | 10/1994 | Sheldon et al. .......................... 409/235 |
| 5,388,935 | 2/1995 | Sheldon .................................. 409/211 |
| 5,401,128 | 3/1995 | Lindem et al. ......................... 408/236 |

FOREIGN PATENT DOCUMENTS

| | | |
|---|---|---|
| 1731593 | 5/1992 | Russian Federation ................. 29/563 |
| 1380915A | 11/1988 | U.S.S.R. . |

*Primary Examiner*—Daniel W. Howell
*Attorney, Agent, or Firm*—Foley & Lardner

[57] ABSTRACT

A space frame system for use with a machine, such as a machine tool, is disclosed. The system as used with a machine tool includes a base and a machine component, such as a workpiece support, mounted to the base. A first space frame is mounted solely to the workpiece support. A second and separate space frame is connected to the first space frame by a plurality of extensible legs. Another machine component, such as a tool holder, is rigidly mounted to the second space frame for cooperation with a workpiece mounted on the workpiece support. Thus, as the extensible legs are independently controlled, the tool holder is moved along a desired path with respect to the workpiece support to perform various cutting operations on the workpiece.

34 Claims, 6 Drawing Sheets

SPACE FRAME FOR A MACHINE TOOL

FIELD OF THE INVENTION

The present invention relates generally to machines, such as machine tools, and particularly to lightweight, rigid space frames for use in machine tools.

BACKGROUND OF THE INVENTION

Many operations performed by machines require a high degree of positional accuracy between different elements of the machine to ensure accurate manipulation or handling of machine components or workpieces. For instance, machine tool structures typically require great rigidity to maintain an accurate relative position between the cutting tool and the workpiece. This has traditionally been accomplished by using massive castings or weldments having the requisite rigidity.

The weight or mass of these machine components is problematic because it limits operational and design capabilities. For example, the massive castings or weldments cannot be moved at high velocity or accelerated at a rate sufficient to meet certain modern machining requirements. Additionally, many modern machining operations require complex movements of the tool, and the corresponding manipulation of massive structures can tremendously inhibit the function and precision of the machine. However, if lighter structures are used, the stiffness of the machine is sacrificed and the machining operations are less accurate. Insufficiently rigid structures cause instability in machine operation that can lead to undesirable affects such as tool chatter.

Also, as tolerance requirements for machined components continually rise, this instability and lack of accuracy become even more unacceptable. Along with requirements for greater accuracy, there is continual demand for higher production rates requiring greater tool speed and greater tool acceleration. For example, rapid acceleration is required when the cutting tool is moved quickly around a small radius. It is difficult to accurately accelerate existing machine tool structures in this way due to either the mass of the casting or weldment or the lack of structural rigidity in less massive conventional structures.

Currently, some machine tools have incorporated stationary frameworks which reduce the overall mass while maintaining sufficient rigidity for at least certain machine operations. For example, at least one design incorporates a carrying structure which is a closed monocoque body type. This design has an outer stationary framework comprising vertical supports connected to cross pieces. The volume inside this structure is the machine work zone and is sufficiently sized to permit movement of a tool head and sliding table therethrough. However, this design remains limited by the relatively large and stationary framework which must cooperate with sufficiently rigid machine tool heads and workpiece platforms to avoid the flexing which leads to inaccurate machining. The stationary framework is designed to decrease shipping weight rather than to provide a lightweight framework designed to move with a machine component.

In another design, a stationary framework for a machine tool is provided in the form of a tetrahedral structure. This design, again, uses a large stationary frame which reduces shipping weight, but it cannot be moved with an attached machine component. The actual tool head and workpiece holder are disposed within this large tetrahedral frame and are manipulated while the framework remains stationary. Another problem with this type of design is that the framework is subject to flexural stress due to the transfer of forces from the tool head to the workpiece supports. This is unacceptable for precise machining operations.

In another design, an external stationary octahedral machine tool frame is used to provide rigidity to the overall framework of a machine tool while lessening the actual mass. In this design, an external, octahedral frame supports both a work table and servostruts which, in turn, support the spindle head. This design fails to disclose a lightweight, rigid, moveable truss-based framework capable of maintaining positional constancy between elements in a machine. The external, octahedral frame decreases shipping weight but it does not improve performance of the machine by reducing moving mass.

The various drawbacks of currently available machine designs are addressed by the present invention.

SUMMARY OF THE INVENTION

The present invention features a moving rigid structural framework system for a machine, such as a machine tool, which is designed to perform selected operations on a workpiece. The framework system comprises a lightweight space frame having interconnected struts and nodes providing a rigid framework that can move a machine component while maintaining positional accuracy. The reduced weight allows the space frame to move with high velocities and rapid accelerations.

According to one embodiment, the framework system comprises a first machine tool component which cooperates with the workpiece and a first space frame. The space frame includes a group of mounting struts rigidly attached to the machine tool component. The mounting struts extend outwardly from the machine tool component and terminate at a plurality of outer connection regions. The space frame also includes a group of support struts at least some of which extend from the outer connection regions. The support struts are interconnected to counteract forces acting against the machine tool component without incurring appreciable bending of either the mounting struts or the support struts.

According to further aspects of the invention, the rigid structural framework system includes a second machine tool component which cooperates with the workpiece. A space frame is rigidly attached to the second machine tool component, and an actuator system connects the second space frame to the first space frame. The actuator system moves the first space frame with respect to the second space frame along a predetermined path.

According to additional aspects of the invention, a machine tool comprises a base and a workpiece support mounted to the base. A first space frame is mounted to the workpiece support and a second space frame is disposed separate from the first space frame. A machine tool component, such as a tool holder having a spindle, is mounted to the second space frame. A plurality of extensible legs connect the first space frame to the second space frame. The extension of each extensible leg is controllable to move the machine tool component along a desired path with respect to the workpiece support.

BRIEF DESCRIPTION OF THE DRAWINGS

The invention will hereafter be described with reference to the accompanying drawings, wherein like referenced numerals denote like elements, and.

DETAILED DESCRIPTION OF THE PREFERRED EMBODIMENT

The present invention encompasses a movable truss-based space frame for use in machines where positional accuracy must be maintained between machine components without sacrificing the desired speed and acceleration of one component with respect to the other. Space frames, according to the invention, are made of struts connected by nodes and are configured to counteract forces exerted against an attached machine component without appreciable flexing. These space frames can be used singly or in combination with others depending on the specific application. For example, in a conventional machine tool, a single space frame could be attached to a spindle and mounted for either vertical movement along an upright column or horizontal movement along a bed. Although the inventive lightweight, movable space frames can be used in a variety of machines, the following description will describe a preferred embodiment in which two space frames are used in a modern multi-axis machine tool. The description of this preferred embodiment should not be construed as limiting the broader concepts and uses of this invention.

Figure 1:
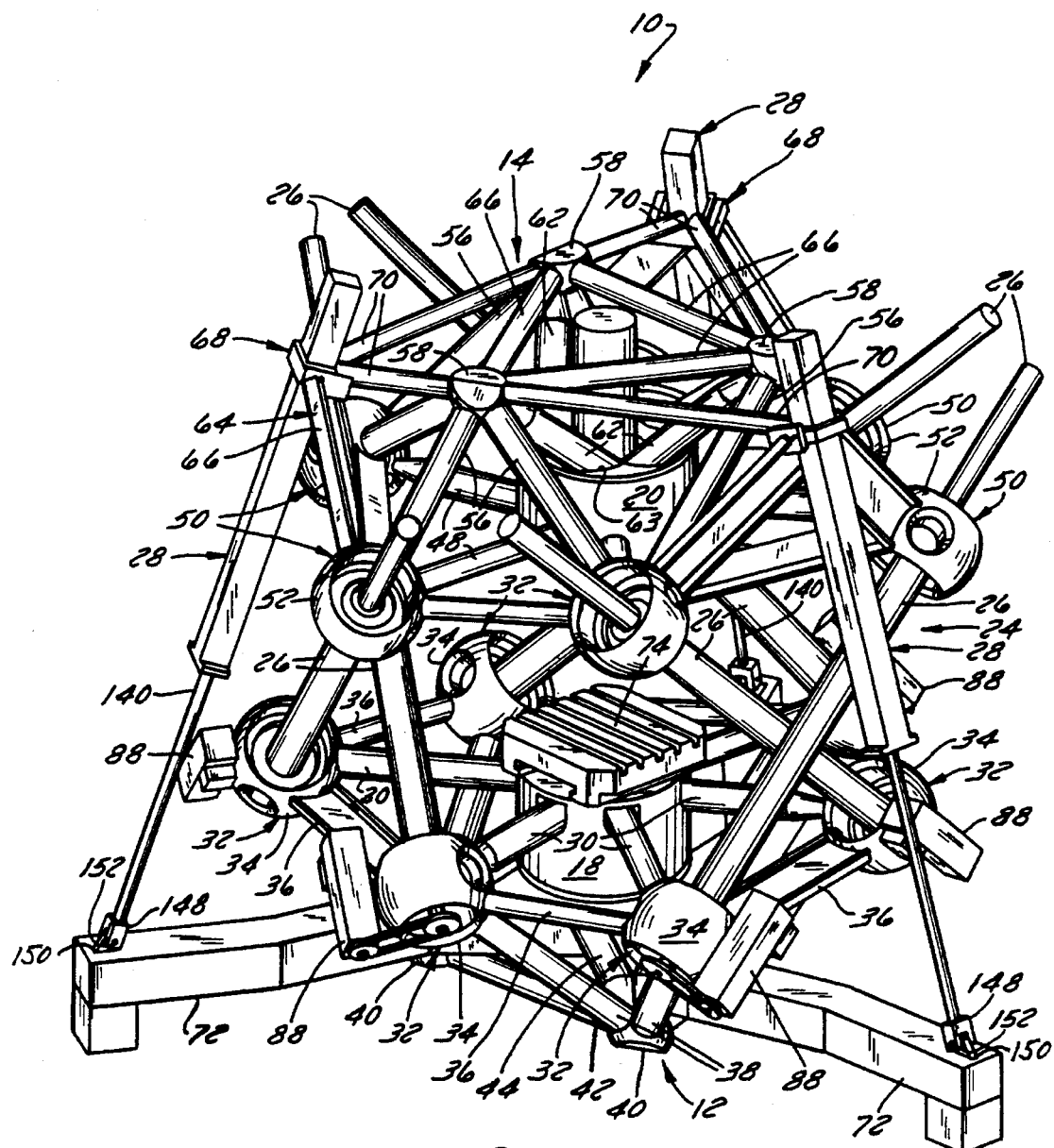
FIG. 1 is a perspective view of a machine tool having space frames according to a preferred form of the present invention.
Figure 2:
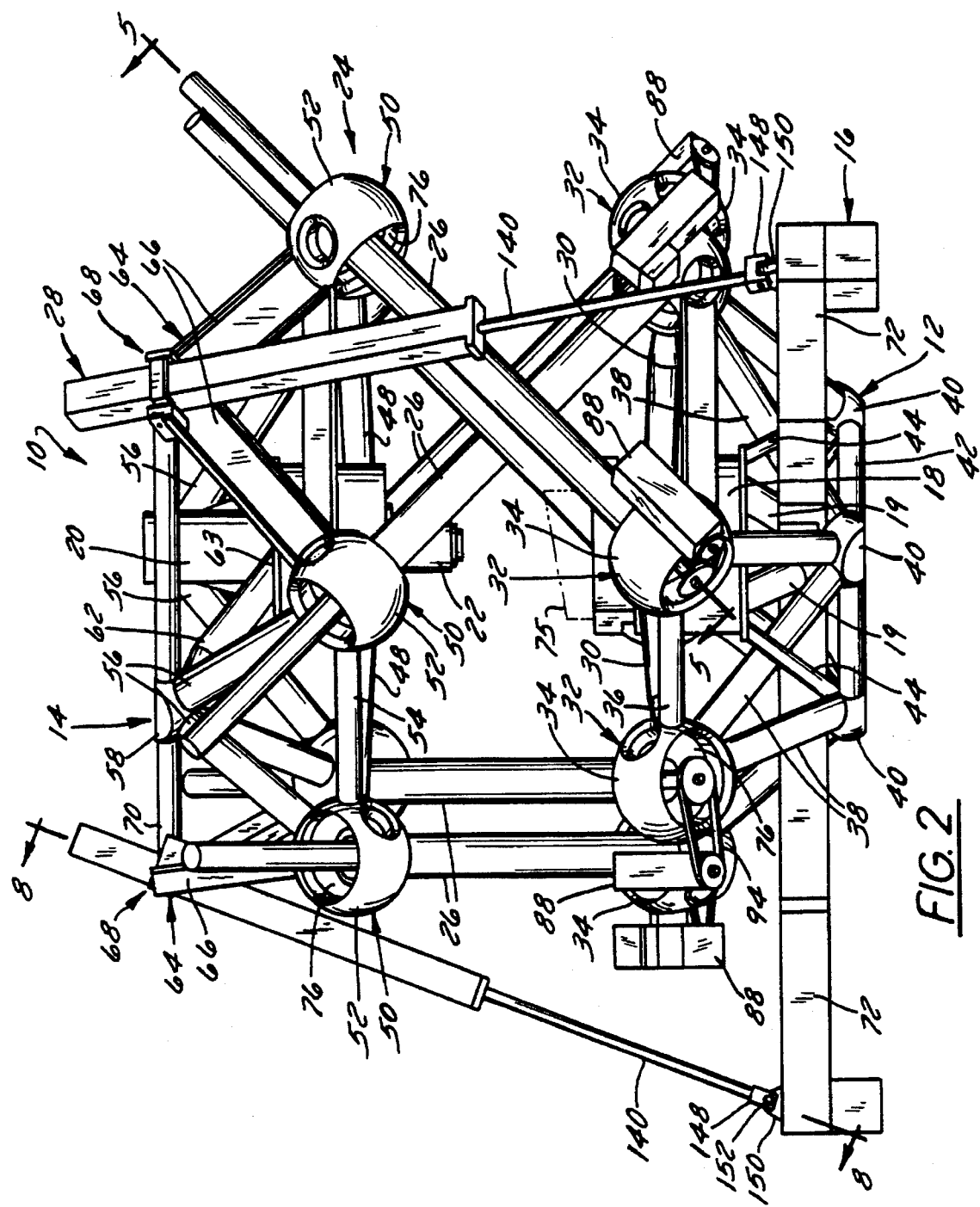
FIG. 2 is a front elevation view of the machine shown in FIG. 1.
Figure 3:
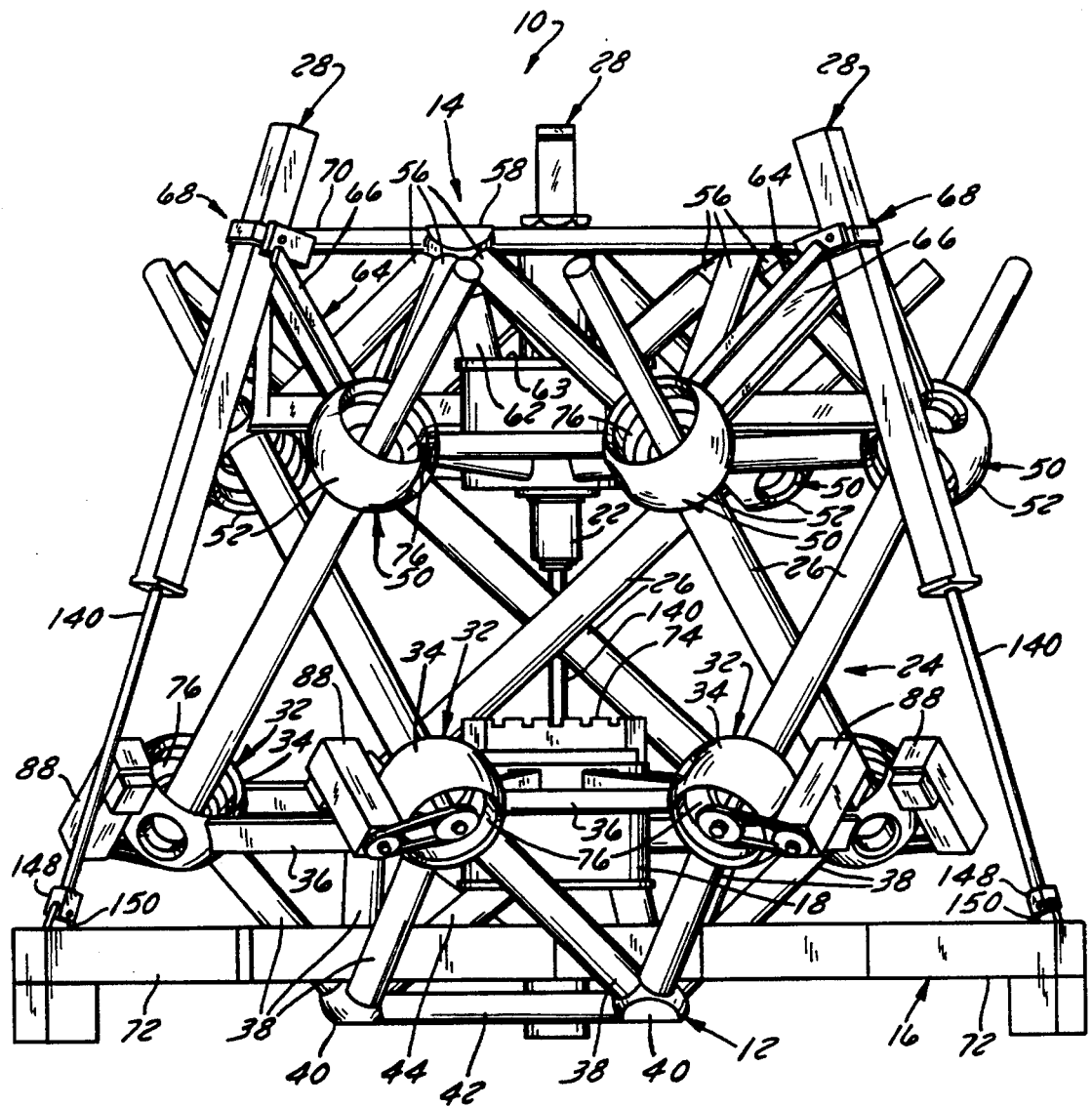
FIG. 3 is a side elevation view of the machine shown in FIG. 1.

Referring generally to FIGS. 1-3, a preferred embodiment of a machine 10 is shown to incorporate two truss-based space frames, a lower space frame 12 and an upper space frame 14. Of course, space frames 12 and 14 can be made in a variety of configurations and used with a variety of other machines where a rigid, flexurally stiff member is needed to maintain positional constancy between disparate elements of the machine, and the mass of a solid frame member would detrimentally affect the machine's operation.

Additionally, the reader should note the space frames in the illustrated embodiment are referred to as lower space frame 12 and upper space frame 14 merely for descriptive purposes. This should not be construed as limiting the position of one space frame with respect to the other.

In the illustrated embodiment, space frames 12 and 14 are used in machine 10, hereinafter machine tool 10, to facilitate various machining operations, such as milling, boring, drilling or finishing. Machine tool 10 includes a base 16 to which is mounted a machine tool component, such as workpiece support 18, preferably by mounting struts 19 (see FIG. 2). Space frame 12 is mounted rigidly to workpiece support 18, and although it could be mounted to base 16, it is often preferable to mount space frame 12 directly and solely to workpiece support 18.

Space frame 14 is disposed separately from space frame 12 and is rigidly attached to another machine tool component, such as tool holder 20. Typically, tool holder 20 includes a spindle 22 configured to grip and rotate a cutter or other machining tool (not shown). Space frame 12 and space frame 14 are moved with respect to each other by an actuator mechanism 24 which, in the illustrated embodiment, comprises a plurality of extensible legs 26. However, in a more conventional machine tool, single or multiple space frames could be attached to a bed or an upright by an actuator mechanism, such as a ball nut and ball screw driven by an electric motor. Thus, the actuator mechanism would move the space frame with respect to the bed or the upright. Additionally, machine tool 10 may include a counterbalance or a plurality of counterbalances 28, preferably connected between space frame 14 and base 16.

Referring specifically to space frame 12 as most clearly shown in FIGS. 1 and 2, a group of mounting struts 30 are rigidly attached to workpiece support 18 and extend outwardly therefrom. Each mounting strut 30 has an outer connection region 32 which, in the illustrated embodiment, includes a housing 34. Each housing 34 is preferably interconnected with the next adjacent housing 34 by a supporting cross-strut 36. In the illustrated embodiment, mounting struts 30 and cross-struts 36 lie generally in a horizontal plane, although the plane could lie in almost any orientation and the relative disposition of the struts could be changed according to the specific application.

Additionally, a plurality of supporting struts 38 extend generally downwardly and inwardly from housings 34 to combine at a plurality of connection regions or nodes 40. In the preferred embodiment, there are three connection regions 40 and each is connected to the next adjacent connection region 40 by a linking support strut 42. Thus, in the illustrated embodiment, there are six housings 34 and three connection regions 40 interconnected by nine supporting struts 38, i.e. three support struts 38 extend from each connection region 40 to adjacent housings 34. Additionally, at least one workpiece support strut 44 extends between each connection region 40 and workpiece support 18 to help rigidly secure workpiece support 18 within space frame 12.

With this overall configuration of space frame 12, the various struts are disposed in triangular patterns which maintain the space frame in a stiff, inflexible configuration. Even when forces are placed on space frame 12 by either workpiece support 18 or extensible legs 26, the triangular strut patterns are able to counter these forces in substantially either compression or tension, rather than permitting bending loads which would tend to flex the struts and distort the overall configuration of space frame 12.

Space frame 14 is similar and includes a group of mounting struts 48 rigidly attached to tool holder 20 and extending outwardly therefrom. Each mounting strut 48 has an outer connection region 50 which, in the illustrated embodiment, includes a housing 52. Each housing 52 is preferably interconnected with the next adjacent housing 52 by a supporting cross-strut 54. In the illustrated embodiment, mounting struts 48 and cross-struts 54 lie generally in a horizontal plane when legs 26 are equally extended. However, the plane could lie in almost any orientation and the relative disposition of the struts could be changed according to the specific application.

Figure 4:
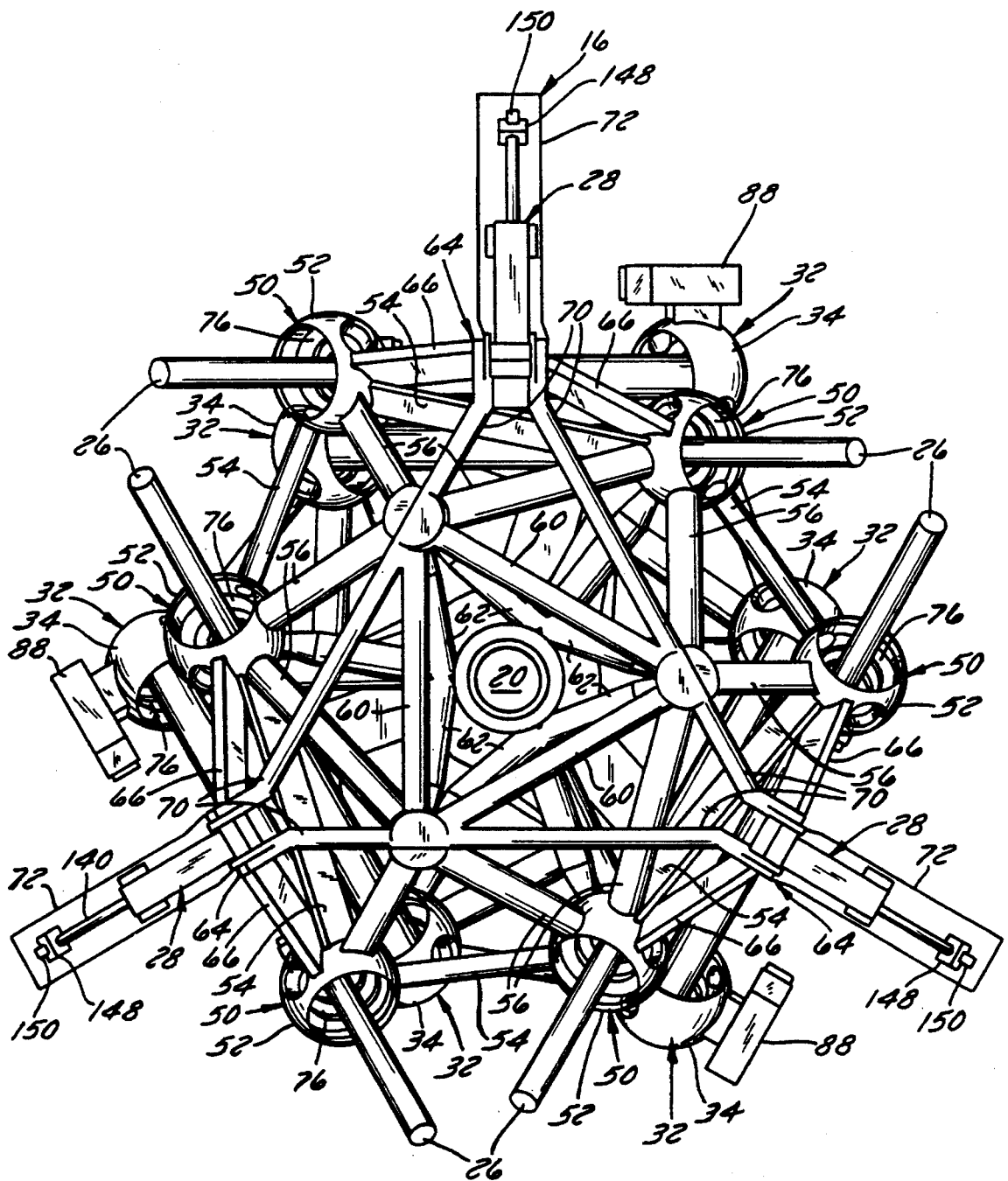
FIG. 4 is a top plan view of the machine shown in FIG. 1.

Additionally, a plurality of supporting struts 56 extend generally upwardly and inwardly from housings 52 to combine at a plurality of connection regions or nodes 58. (The terms upwardly and downwardly are used to facilitate description of the illustrated embodiment only and should not be construed as limiting the potentially different orientations of the struts.) In the preferred embodiment, there are three connection regions 58 and each is connected to the next adjacent connection region 58 by a linking support strut 60. Thus, in the illustrated embodiment, there are six housings 52 and three connection regions 58 interconnected by nine support struts 56, i.e. three support struts 56 extend from each connection region 58 to adjacent housings 52. Additionally, at least one tool holder support strut, and preferably a pair of tool holder support struts 62, extend between each connection region 58 and a mounting plate 63 rigidly connected to tool holder 20 (see FIG. 4). This configuration rigidly secures tool holder 20 within space frame 14.

With this overall configuration of space frame 14, the various struts are disposed in triangular patterns which maintain the space frame in a stiff, inflexible configuration. Even when forces are placed on space frame 14 by either tool holder 20 or extensible legs 26, the triangular strut patterns are able to counter these forces in substantially either compression or tension, rather than permitting bending loads which would tend to flex the struts and distort the overall configuration of space frame 14.

Space frame 14 also includes a mounting bracket 64 for each counterbalance 28. Preferably, each mounting bracket 64 includes a pair of braces 66, such as U-channel members, which extends from two adjacent housings 52 to an attachment region 68. A second pair of braces 70 preferably extends from attachment region 68 to a pair of adjacent connection regions 58 to securely hold the corresponding counterbalance 28 with respect to space frame 14. In the illustrated embodiment, there are three counterbalances 28 and three corresponding mounting brackets 64 disposed generally equidistant from one another about space frame 14. Each attachment region 68 may be connected to its corresponding counterbalance 28 by a variety of fasteners, such as clamps, weldments, or bolts.

In space frames 12 and 14, most of the struts are preferably tubular having an external wall and a hollow interior. The tubular design provides for the same cross-sectional area of material as a solid strut while having a larger overall strut diameter. This larger diameter promotes strut stability and helps prevent buckling. The external wall thickness and outside diameter can be optimized according to the specific space frame application. However, a variety of other strut types may be used, including T-type struts, I-type struts, or U-type struts. In fact, in the illustrated embodiment, alternate cross-struts 36 and 54 are preferably flat or T-shaped to provide additional clearance for counterbalances 28 when space frame 14 is moved with respect to space frame 12.

Workpiece support 18 and tool holder 20 can generally be referred to as machine tool components. These machine tool components could be interchanged or could have a variety of configurations. For instance, in the illustrated embodiment, the workpiece support 18 and an attached workpiece remain stationary, while tool holder 20, with its attached tool, moves about the workpiece performing various machining operations. However, tool holder 20 could be mounted in space frame 12 while the workpiece support 18 and corresponding workpiece are mounted in space frame 14. Additionally, these machine tool components could be a variety of components other than workpiece supports or tool holders, depending on the type of operation being performed by machine 10.

In the preferred embodiment, base 16 has three radially extending legs 72 to which workpiece support 18 is attached. In many applications, space frame 12 is rigidly and solely affixed to workpiece support 18. This helps avoid contortion of space frame 12 with respect to space frame 14 if workpiece support 18 flexes or moves with respect to base 16. A pallet or workpiece holding fixture 74 is rigidly affixed to workpiece support 18 and may be configured in a variety of shapes or forms depending on the type of workpiece to be held. Often, pallet 74 will include various clamps or extensions to securely hold an object or workpiece 75, as shown in dashed lines in FIG. 2.

The machine tool component mounted in space frame 14, such as tool holder 20, is similarly, rigidly affixed within the space frame. The configuration of space frame 14, like that of space frame 12, maintains tool holder 20 in a precise location relative to space frame 14 so rapid, accurate machining operations can be performed by moving the space frames with respect to each other. The triangular arrangement of struts in space frame 14 greatly stiffens it, so spindle 22 and its attached tool can be accurately, consistently, and rapidly moved to exact machining points on the workpiece.

Actuator mechanism 24 moves space frame 14 relative to space frame 12 along a predetermined or programmed path to perform the desired machining operations. In the preferred embodiment, this actuator mechanism comprises a plurality of legs, such as the six legs shown in FIGS. 1–4. Although a variety of types and numbers of extensible legs 26 can be used, the preferred embodiment has six legs arranged in three pairs of generally crossed legs. This allows movement of spindle 22 with respect to the workpiece along six different axes to accommodate complex machining operations. The crossing of the legs provides a greater stability between space frame 12 and space frame 14.

Each extensible leg 26 is pivotably mounted within housing 34 of space frame 12 and a corresponding housing 52 of space frame 14. The legs may be mounted within the housing in a variety of ways, but are preferably pivotably mounted in corresponding gimbals 76.

Figure 5:
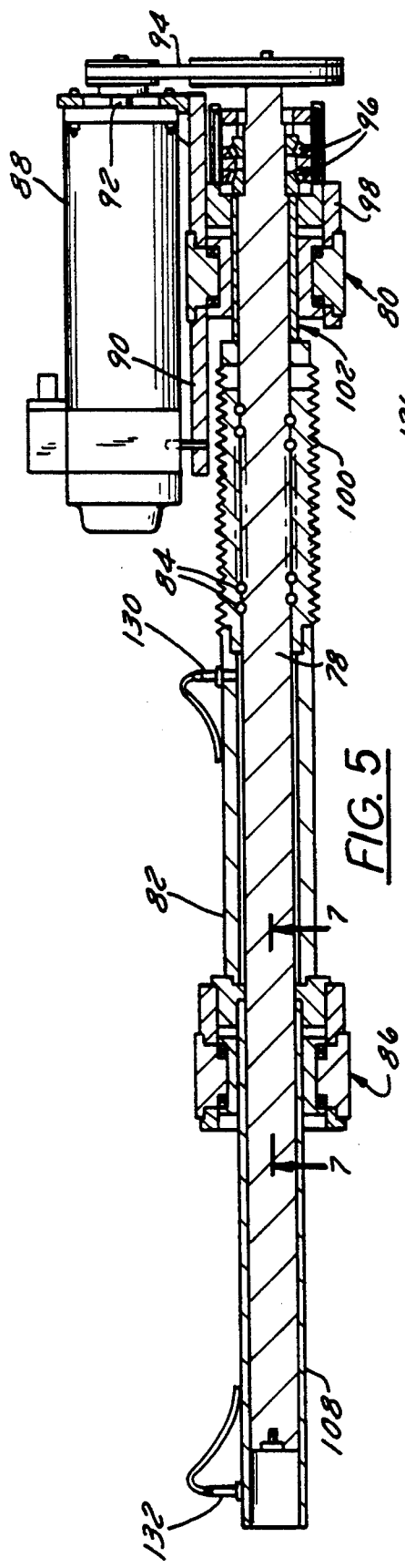
FIG. 5 is a cross-sectional view taken generally along line 5—5 of FIG. 2.
Figure 7:
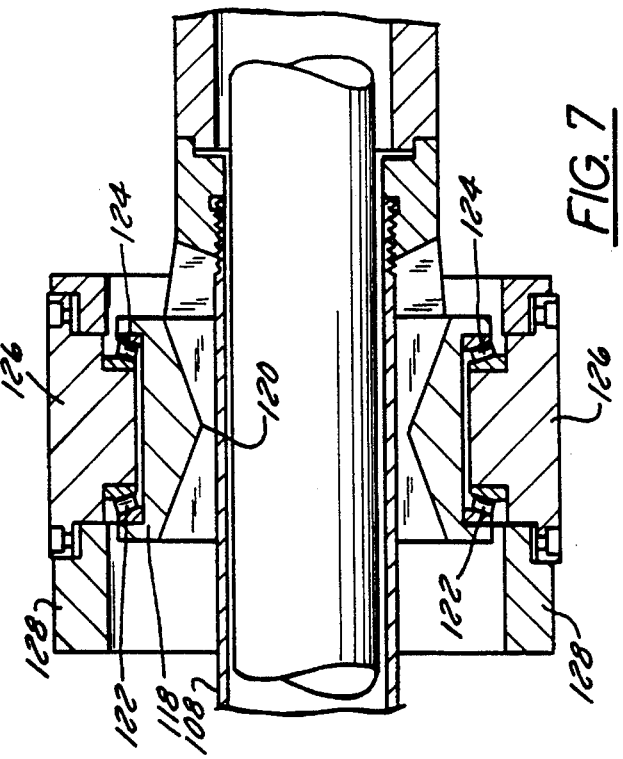
FIG. 7 is a cross-sectional view taken generally along line 7—7 of FIG. 5.
Figure 6:
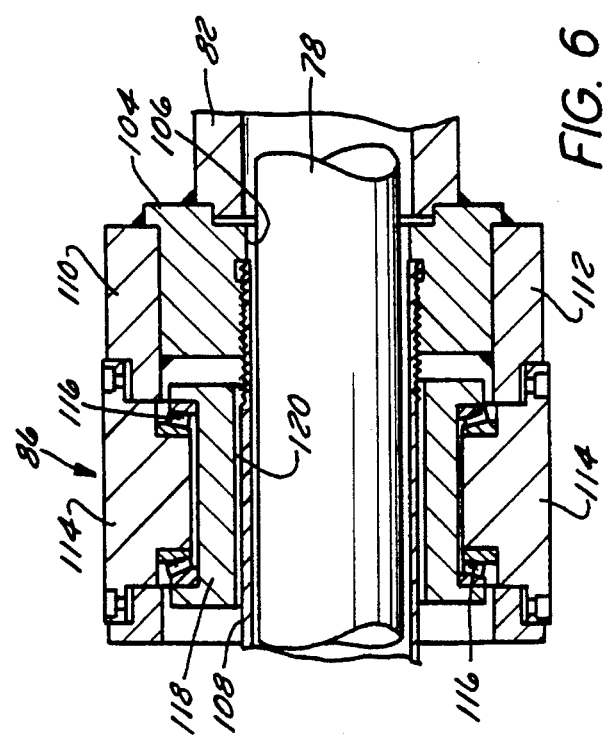
FIG. 6 is a partial longitudinal cross-sectional view of one of the yoke assemblies for connecting the powered leg to a platform or support.

Extensible legs 26 may include pneumatic cylinders, hydraulic cylinders, pulley arrangements or ball screw mechanisms. One preferred type of extensible leg is illustrated in FIGS. 5–7 and includes a ball screw arrangement. Generally, a rotatable ball screw 78 is mounted with a stationary platform yoke assembly indicated generally by the reference numeral 80. A nut tube 82 surrounds and is operatively connected to the ball screw rod by a plurality of recirculating balls 84. The nut tube 82 is connected to a movable platform yoke assembly indicated generally by the numeral 86. The yoke assemblies 80 and 86 are connected to corresponding gimbals 76 of space frames 12 and 14. The ball screw 78 is rotated by a hydraulic or electric motor 88 mounted on a bracket 90 connected to the yoke assembly 80. Motors 88 can also be mounted on their corresponding housings 34. The motor has an output shaft 92 connected to the ball screw 78 by a toothed belt 94 operating between pulleys connected to the output shaft 92 and the ball screw 78. The ball screw 78 is journaled in a pair of thrust bearings 96 mounted in a cage associated with a motor fork 98 that forms part of the stationary platform yoke assembly 80. A bellows 100 is connected at one end to the nut tube 82 and at the other end to a tube 102 which, in turn, is connected to the motor fork 98.

As the ball screw 78 is rotated by the motor 88, the nut tube 82 will move along the length of the screw 78 in a direction dependent upon the direction of rotation of the screw 78. The effect will be to reduce or extend the distance between the yoke assemblies 80 and 86, thereby varying the effective length of the leg.

Figure 8:
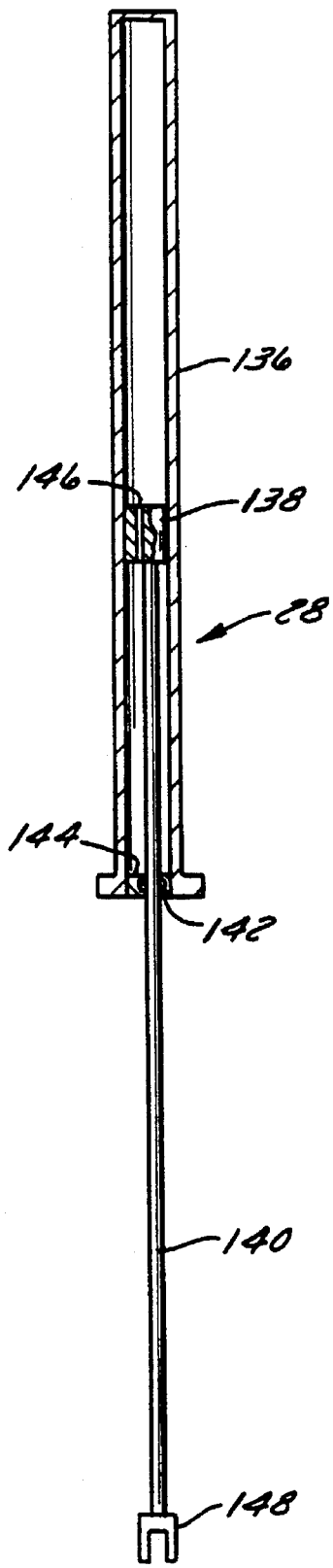
FIG. 8 is a cross-sectional view taken generally along line 8—8 of FIG. 2.

Referring specifically to FIGS. 6–8, the movable platform yoke assembly 86 includes a U-shaped fork 104 which is connected to the nut tube 82 and which has a central opening 106 through which the screw 78 passes. A protective tube 108 extends from the fork 104 along the outside of the screw 78. The side arms 110 and 112 of the fork 104 mount bearing holders 114 that hold the inner race of thrust bearings 116 in recesses in opposite side faces of a block 118. Block 118 has a central opening 120 which is flared from the mid-point of the opening towards the opposite ends of the block 118, as shown in FIG. 7. The remaining two side faces of the block 118 have bearing recesses 122 which receive thrust bearings 124 held in place by bearing retainers 126. The bearing retainers 126 are mounted in spaced arms 128 of a second fork attached to the movable platform. By reason of the construction, the two forks are disposed at 90° from each other.

As will be appreciated, the yoke assembly 86 allows rotary motion about an axis through the bearings 124 and rotary motion about an axis through the bearings 116. The flared shape of the opening 120 accommodates the latter rotary motion. In addition, the upper yoke assembly 86 restricts rotation of the ball screw nut about its axis relative to the upper yoke assembly 86. The construction and operation of the fixed platform yoke assembly 80 is the same as that described for the movable platform yoke assembly 86.

Mounting the yoke assemblies at points along the length of the powered leg, rather than at the ends, results in a significant increase in the ratio of the maximum to minimum distance between the yoke assemblies as the leg moves.

A first proximity switch 130 is mounted in the nut tube 82 near the cage for the balls. A second proximity switch 132 is mounted near the end of the protective tube 108. The proximity switches 130 and 132 are used to halt motion when the ball screw rod 78 reaches the limits of its allowed motion. That is, when the end of the ball screw 78 changes the state of the proximity switch 132, the power leg will have been shortened to its pre-established limit of travel. The condition shown in FIG. 5 is near that short limit of travel. On the other hand, when the end of the ball screw 78 changes the state of the proximity switch 130, the length of the powered leg will have been extended to its maximum desired limit. In both cases, the proximity switches 130 and 132 prevent the continued actuation of the motor 88.

Counterbalances 28 can also be made in a variety of configurations to help counter the gravitational weight of space frame 14 with respect to space frame 12. However, a preferred form of counterbalance 28 is a gas spring as illustrated in FIG. 8. An outer cylinder 136 is mounted to attachment region 68 and includes a guide 138 slidably received therein. Guide 138 is connected to a rod 140 which slides through a bearing 142 having a seal 144. Seal 144 traps a fluid, preferably a pressurized gas such as nitrogen gas, within the hollow interior of outer cylinder 136.

Guide 138 includes a large opening 146 extending longitudinally therethrough to allow movement through cylinder 136 with rod 140. Basically, guide 138 facilitates the movement of rod 140 through cylinder 136 so counterbalance 28 can function as a gas spring. As rod 140 is forced farther into cylinder 136 by movement of space frame 12 with respect to space frame 14, the internal volume of cylinder 136 is decreased and the gas is further pressurized. This additional pressurization biases rod 140 in the opposite direction, creating a spring effect.

Additionally, rod 140 is pivotally attached to base 16 by a clevis 148 attached to the distal end of rod 140. Clevis 148 is preferably attached to a boss 150 mounted on base 16. Clevis 148 may be pivotably attached to boss 150 by a pin 152. (See FIG. 2.)

By controlling the extension and retraction of each leg 25, the spindle 22 and cutting tool can be moved along a predetermined path with respect to the workpiece. The six legs provide at least six axes (X,Y,Z,A,B,C) along which the cutting tool may be moved. The movement of the legs and cutting tool is typically controlled by a computer control system designed to provide blocks of instruction concerning the X,Y,Z,A,B,C coordinates of the cutting tool and workpiece relative to each other. The following method can be programmed to control machine tool 10. The steps are arranged in logic sequence form and can be summarized as follows:

I. Initializing present machine X,Y,Z,A,B,C coordinates
II. For each of six legs:
  A. Initialize top and bottom pivot vector coordinates.
  B. Calculate and initialize present leg length.
  C. Define X,Y,Z,A,B,C home position for present leg length.
III. Set sub-block time (typically 0.02–0.004 seconds) sufficiently short to achieve desired linearity and precision of movement.
IV. For each part program:
  A. For each block:
    1. From the part program read machine coordinates of destination; X,Y,Z,A,B,C and feed rate.
    2. Using feed rate and sub-block time, compute the number of sub-blocks required to reach block destination.
    3. For each sub-block:
      (a) For each of six coordinates:
        1. Present value=ending value of previous sub-block.
        2. Ending value=(destination value minus present value) divided by number of sub-blocks remaining plus present value.
      (b) Using the ending value of the six coordinates, compose a sub-block ending vector
      (c) For each leg:
        1. Rotate the top pivot vector to the ending angles for the current sub-block.
        2. Add a sub-block ending vector to the result.
        3. Subtract the bottom pivot vector from the result.
        4. Calculate the ending leg length by extracting the square root of the sum of the squares of the coordinates of the result of step (c) (3).
        5. Convert the ending leg length to the nearest integral servo position command count.
        6. Send the position count to a servo command buffer.
        7. Calculate the leg velocity required to reach new leg length in one sub-block time.
        8. Convert the leg velocity to the nearest integral servo command count.
        9. Send velocity count to the servo command buffer.
      (d) Send sub-block start command simultaneously to all leg servos.
  B. A block is completed when no sub-blocks remain.
V. The task is completed when no blocks remain in the part program.

Initializing the present machine is a process which is known in the machine tool art as gridding. It establishes a home position in which the tip of the tool and the center of the workpiece cube are coincident.

A top pivot vector is the vector of the tool tip relative to a top pivot point for a particular leg. A bottom pivot vector is the vector of the center of the workpiece cube relative to a bottom pivot for a particular leg. The top pivot vectors remain at a fixed length but can rotate through the A,B,C coordinates.

It will be understood that the foregoing description is of a preferred exemplary embodiment of this invention and that the invention is not limited to the specific forms shown. For example, the various struts which make up the space frames may be arranged in a variety of configurations, depending on the specific application. Additionally, a single space frame could be used with a solid platform, or single space frames could be configured to replace solid moving components in conventional machine tools. The scope of the invention also includes the use of space frames in a variety of machines other than the preferred illustrated embodiment. For example, space frames can be used in a variety of situations where it is desirable to decrease mass while retaining stiffness and positional constancy between elements of a machine. Additionally, the struts may be made from a variety of materials and in a variety of configurations. The base, counterbalances, and actuator mechanism can all be adapted or changed to suit a specific situation, e.g., the extensible legs need not be in crossed pairs for many applications. These and other modifications may be made in the design and arrangement of the elements without departing from the scope of the invention as expressed in the appended claims.

What is claimed is:

1. A rigid structural framework system for a machine tool designed to perform selected operations on an object, comprising:
    a first machine tool component which cooperates with the object; and
    a first space frame having:
        a group of first mounting struts rigidly connected to the machine tool component, extending outwardly therefrom, and terminating at a plurality of first outer connection regions;
        a group of first support struts at least some of which extend from the outer connection regions, the support struts being interconnected to counteract forces acting against the machine tool component without incurring appreciable bending of either the mounting struts or the support struts;
    a second machine tool component which cooperates with the object;
    a second space frame rigidly attached to the second machine tool component; and
    an actuator system connecting the second space frame to the first space frame to move the first space frame with respect to the second space frame along a predetermined path.

2. The rigid structural framework system as recited in claim 1, wherein the second space frame has:
    a group of second mounting struts rigidly connected to the second machine tool component, extending outwardly therefrom, and terminating at a plurality of second outer connection regions; and
    a group of second support struts at least some of which extend from the second outer connection regions, the second support struts being interconnected to counteract forces acting against the second machine tool component without incurring appreciable bending of either the second mounting struts or the second support struts.

3. The rigid structural framework system as recited in claim 2, wherein the actuator system comprises a plurality of extensible legs connected between selected first outer connection regions and selected second outer connection regions.

4. The rigid structural framework system as recited in claim 3, wherein there are six extensible legs.

5. The rigid structural framework system as recited in claim 2, wherein the first machine tool component comprises a spindle for holding a tool.

6. The rigid structural framework system as recited in claim 5, wherein the second machine tool component comprises a workpiece holder.

7. The rigid structural framework system as recited in claim 3, wherein the first outer connection regions comprise gimbal housings to which the first mounting struts and first support struts are affixed.

8. The rigid structural framework system as recited in claim 7, wherein the second outer connection regions comprise gimbal housings to which second mounting struts and second support struts are affixed.

9. The rigid structural framework system as recited in claim 8, wherein each extensible leg is connected to a pair of gimbals one of said pair of gimbals being mounted in a corresponding gimbal housing of the first outer connection regions and the other of said pair of gimbals being mounted in a corresponding gimbal housing of the second outer connection regions.

10. The rigid structural framework system as recited in claim 3, further comprising a base mounted to the second machine tool component.

11. The rigid structural framework system as recited in claim 10, further comprising counterbalances connected between the base and the first space frame.

12. A structural member of a machine tool, comprising:
    a plurality of struts;
    a plurality of strut connection regions interconnecting groups of struts from the plurality of struts; and
    a machine tool component fixedly mounted to selected struts of the plurality of struts, wherein the forces generated against the machine tool component during machining operations are transferred through at least some of the selected struts and are disseminated to other struts of the plurality of struts at selected strut connection points;
    wherein the machine tool component is attached to a strut connection plate and the strut connection regions and the plurality of struts are arranged in triangular patterns with each triangular pattern having three interconnected struts;
    further wherein the machine tool component comprises a workpiece holder.

13. A space frame which can be used as a moving structural component in machines to facilitate maintaining the positional relationship between an object and a machine component, comprising:
    a plurality of struts;
    a plurality of connection regions, each connection region being connected to selected struts of the plurality of struts to hold the plurality of struts in a framework of interconnected struts; and
    a machine component mounting region disposed on the framework, the machine component mounting region being configured to rigidly receive the machine component.

14. The space frame as recited in claim 13, wherein the plurality of struts and plurality of connection regions are arranged to counteract forces acting against the mounting member, the plurality of struts and plurality of connection regions being further arranged to receive the forces substantially in either compression or tension.

15. The space frame as recited in claim 14, wherein the plurality of the struts are connected in triangular patterns.

16. The space frame as recited in claim 15, further comprising a plurality of connection points configured for attachment to an actuator mechanism.

17. A machine tool, comprising:
   a base;
   a workpiece support mounted to the base;
   a first space frame mounted to the workpiece support;
   a second space frame separate from the first space frame;
   a tool holder mounted to the second space frame; and
   a plurality of extensible legs connecting the first space frame to the second space frame, wherein the extension of each extensible leg is controllable to move the tool holder along a desired path with respect to the workpiece support.

18. The machine tool as recited in claim 17, wherein the first space frame includes a plurality of struts interconnected in triangular patterns to provide space frame rigidity.

19. The machine tool as recited in claim 18, wherein the second space frame includes a plurality of struts interconnected in triangular patterns to provide space frame rigidity.

20. The machine tool as recited in claim 19, wherein the first space frame is mounted to the workpiece support and the plurality of extensible legs.

21. The machine tool as recited in claim 17, wherein there are six extensible legs.

22. The machine tool as recited in claim 19, wherein each extensible leg includes a ball screw arrangement driven by a motor.

23. The machine tool as recited in claim 19, further comprising a counterbalance connected between the base and the second space frame.

24. The machine tool as recited in claim 23, wherein the counterbalance includes a gas spring.

25. A method for moving a machine tool framework to cooperate with a designated object and for providing structural rigidity in the machine tool framework while eliminating mass, the method comprising the steps of:
   assembling a plurality of struts into a space framework;
   interconnecting the plurality of struts at a plurality of strut connection points;
   mounting a machine tool component to selected struts of the plurality of struts;
   orienting the struts so they substantially counteract resulting stresses in either compression or tension when forces are placed against the machine tool component;
   moving the space frame with respect to the designated object; and
   causing an interaction between the machine tool component and the designated object.

26. The method as recited in claim 25 for providing structural rigidity in a machine tool, further comprising the step of arranging the struts in triangular patterns to provide strength and rigidity.

27. The method as recited in claim 26 for providing structural rigidity in a machine tool, further comprising the step of providing a plurality of mounting regions on the space framework, the mounting regions being configured to receive extensible control legs.

28. The method as recited in claim 25 for providing structural rigidity in a machine tool, further comprising the step of forming the struts from hollow members.

29. A method for maintaining an element of a machine tool at a constant distance relative to the position of a separate element of the machine tool while the element is moved relative to an object, comprising the steps of:
   constructing a space frame from a plurality of struts;
   orienting the struts to substantially receive forces in either tension or compression;
   attaching the space frame to the element and the separate element of the machine; and
   moving the space frame relative to the remainder of the machine tool.

30. The method as recited in claim 29, wherein the step of orienting the struts includes placing groups of three struts into interconnected triangular configurations.

31. The method as recited in claim 29, further comprising the step of forming at least some of the struts from hollow members.

32. The rigid structural framework system as recited in claim 1, wherein at least some struts of the group of first mounting struts and the group of first support struts have hollow interiors.

33. A machine tool, comprising:
   a base;
   a workpiece support mounted to the base;
   a first space frame mounted to the workpiece support;
   a second space frame separate from the first space frame;
   a tool holder mounted to the second space frame; and
   an actuator system connecting the second space frame to the first space frame to move one of the first or second space frames with respect to the other along a predetermined path.

34. The machine tool as recited in claim 33, wherein the first space frame and the second space frame each include a plurality of hollow struts.

* * * * *